United States Patent [19]

Buchreiter et al.

[11] 4,242,319

[45] Dec. 30, 1980

[54] PROCESS FOR PRODUCTION OF CYANOGEN CHLORIDE

[75] Inventors: Georg Buchreiter; Peter Kniep; Kurt Scheinost, all of Trostberg; Heinz-Rudiger Vollbrecht, Stein, all of Fed. Rep. of Germany

[73] Assignee: SKW Trostberg Aktiengesellschaft, Trostberg, Fed. Rep. of Germany

[21] Appl. No.: 65,022

[22] Filed: Aug. 9, 1979

[30] Foreign Application Priority Data

Aug. 31, 1978 [DE] Fed. Rep. of Germany ....... 2838016

[51] Int. Cl.$^3$ .......................................... C01B 21/088
[52] U.S. Cl. ..................................... 423/383; 423/481
[58] Field of Search ........................ 423/383, 481, 488

[56] References Cited

U.S. PATENT DOCUMENTS 1,938,324  12/1933  Dieterle ............................... 423/383

FOREIGN PATENT DOCUMENTS 1801311  2/1971  Fed. Rep. of Germany ........... 423/383
347989   5/1931  United Kingdom ..................... 423/383
301911   6/1971  U.S.S.R. ................................... 423/383

*Primary Examiner*—Brian E. Hearn
*Attorney, Agent, or Firm*—Thomas L. Tully

[57] ABSTRACT

Process for producing cyanogen chloride by reacting hydrocyanic acid and chlorine in a non-aqueous and/or hygroscopic inorganic solvent.

9 Claims, No Drawings

PROCESS FOR PRODUCTION OF CYANOGEN CHLORIDE

BACKGROUND OF THE INVENTION

Cyanogen chloride is the raw material for the production of cyanuric chloride, which is used in large amounts for manufacturing herbicides, optical brighteners, dyes and other end products. Cyanogen chloride is conventionally produced by reacting hydrocyanic acid and chlorine in an aqueous dilute hydrochloric acid solution, producing the following reaction:

$$HCN + Cl_2 \xrightarrow{H_2O} CNCl + HCl$$

(Ullmann, Vol. 9, Page 652, 1975). In a concentrated aqueous acid medium, the cyanogen chloride is hydrolyzed as a function of the hydrochloric acid concentration. Under certain conditions, a reaction with the chlorine can form nitrogen trichloride from the ammonium chloride generated during hydrolysis. In order to prevent an excessive degree of hydrolysis from having a harmful effect upon the economy of the process, and also to substantially retard the production of nitrogen trichloride, which poses a serious danger to the apparatus and personnel, the hydrochloric acid concentration of the reaction medium is generally kept to 8 to 16 weight percent and preferably 10 weight percent. This process results in a considerable production of highly dilute aqueous hydrochloric acid, for which the equivalent contained in the chlorine reagent can no longer be achieved.

Another problem involved in this process is the recycling and/or elimination of the considerable amounts of this dilute hydrochloric acid.

Therefore, efforts have been made to develop a process in which the generation of hydrochloric acid is controlled in such a way that it constitutes no reduction or, at most, only a slight depreciation relative to chlorine. This has resulted in the process disclosed in German Auslegeschrift No. 18,01,311, wherein hydrogen cyanide and chlorine are caused to react in a non-aqueous, polar, organic fluid, inert with respect to the reactants and reaction products. However, this process results in only relatively low yields (54 to 85%) and, therefore, is not economical in view of the high cost of the raw materials.

SUMMARY OF THE INVENTION

The principal object of the present invention is to avoid the disadvantages of the prior-known processes for manufacturing cyanogen chloride and to provide a new process which offers high yields and few by-products, and produces hydrochloric acid in an easily applicable form.

The objective of the present invention is obtained surprisingly, by the use of non-aqueous and/or desiccating or hygroscopic inorganic solvents which are not reactive with either of the reaction partners, hydrocyanic acid and chlorine, as a reaction medium for the reactants.

The process according to the present invention for manufacturing cyanogen chloride from hydrocyanic acid and chlorine, with formation of hydrochloric acid, is therefore characterized by the fact that the reaction takes place in a non-aqueous and/or desiccating inorganic solvent or a mixture thereof, at a temperature between 0° C. and the boiling point of the particular solvent used and at a pressure between 1 and 6 bars.

The present process results in a substantially complete conversion and provides quantitative yields of cyanogen chloride.

As mentioned above, suitable solvents include both non-aqueous inorganic solvents and desiccating or hygroscopic inorganic solvents, which are inert with respect to the reaction partners. Phosphorus oxychloride, sulfuryl chloride, and silicon tetrachloride are especially preferred. However, other inorganic solvents may be used provided that they are inert towards and capable of dissolving the reaction components, and are liquid at a temperature within the range in which the reaction between chlorine and hydrocyanic acid proceeds at a suitable similar rate. Mixtures, especially those of the above-mentioned preferred solvents, can also be used for the process according to the invention. For example, mixtures of 50% to 80% by volume of phosphorus oxychloride and 50% to 20% by volume of silicon tetrachloride also produce a quantitative yield.

The present process can be carried out at normal atmospheric pressure, but reaction under higher pressure is preferred for technical reasons in those cases where the cyanogen chloride which is formed is subjected immediately to further processing in a closed system. However, the reaction itself proceeds as well under normal pressure as under increased pressure.

The process according to the invention can be carried out discontinuously or continuously; the latter is preferred. Preferably, the solvent is placed in the reaction vessel and chlorine and hydrocyanic acid are added in substantially equivalent amounts to the reaction solution, either batchwise or continuously. Preferably, the chlorine is added in gaseous form, while the hydrocyanic acid is preferably added at a corresponding rate in liquid form. External temperature control keeps the desired reaction temperature between 0° C. and the boiling point of the solvent used, most preferably between about 30° C. and 50° C. Also, the reaction is most preferably carried out at a pressure between about 1 and 2 bars.

In order to achieve the desired purity of the cyanogen chloride, the mixture drawn off from the reactor, consisting of cyanogen chloride and hydrochloric acid, is washed with the appropriate solvent and/or mixture of solvents used for that particular reaction, and the recovered unreacted hydrocyanic acid and chlorine are then recycled into the reactor sump. Preferably, the same solvent and/or mixture of solvents is used for washing which was used as the reaction medium. The gaseous mixture of hydrochloric acid and cyanogen chloride, which is produced during this gas washing procedure, is then separated in a conventional way.

As mentioned above, the process according to the present invention produces quantitative yields. A particular advantage consists in the fact that when the reactants are used in equimolar amounts, anhydrous hydrochloric acid is produced which can be used e.g., either directly for hydrochloridization processes, for recovering chlorine, or for manufacturing concentrated hydrochloric acid.

DESCRIPTION OF PREFERRED EMBODIMENTS

The following examples illustrate the new process of the present invention but should not be considered limiting.

EXAMPLE 1

Phosphorus oxychloride (200 ml.) was placed in a round flask with two or more necks, connected to a washing column. Hydrocyanic acid (27 gm/hour) and chlorine (71 gm/hour) were added to the solvent in equivalent amounts. The temperature in the reactor was adjusted to 40° C. Phosphorus oxychloride (approximately 50 ml./hour) was fed into the wash column mounted atop the flask. Gas analysis of the reaction gas indicated that when the reactants were added in exact amounts, the reaction gas consisted of hydrochloric acid and cyanogen chloride alone. Quantitative evaluation indicated that the reaction gas was composed of 63 weight percent cyanogen chloride and 37 weight percent hydrochloric acid. Conversion to cyanogen chloride was found to be 100 percent.

EXAMPLE 2

Using the experimental apparatus described in Example 1, and using the same reaction conditions, 300 ml. of sulfuryl chloride was used as the solvent instead of the phosphorus oxychloride. The reactants, chlorine and hydrocyanic acid, were added at the rate of 107 gm/hour and 41 gram/hour, respectively. Once again, it was found that this solvent, when added in precise amounts, produced a quantitative conversion of the reactants.

EXAMPLE 3

Using the experimental apparatus described in Example 1, 200 ml. of a mixture of 70% phosphorus oxychloride and 30% silicon tetrachloride was added. Chlorine (142 gm/hour) and hydrocyanic acid (54 gm/hour) were added to this mixture of solvents. The reactor temperature was adjusted to 40° C. By reducing the volume of gas mixture allowed to escape, a pressure of 2 bars was maintained in the reactor. When the amounts of reactants added were maintained precisely, a quantitative conversion to cyanogen chloride was achieved.

Variations and modifications may be made within the scope of the claims and portions of the improvements may be used without others.

We claim:

1. Process for the reaction of hydrocyanic acid with chlorine to produce cyanogen chloride and hydrochloric acid characterized by carrying out said reaction in a non-aqueous inorganic solvent reaction medium at a temperature within the range of from 0° C. to the boiling point of said solvent and at a pressure of from about 1 to 6 bars.

2. Process according to claim 1, characterized by the fact that the reaction takes place at a temperature within the range of from about 30° C. to 50° C.

3. Process according to claim 2, characterized by the fact that the reaction is carried out at a pressure of from about 1 to 2 bars.

4. Process according to any one of claims 1, 2 or 3, characterized by the fact that the reaction products are drawn off from the reactor as a gaseous mixture, washed with the same solvent or mixture of solvents used as the reaction medium, and the recovered unreacted hydrocyanic acid and chlorine are recycled back to the reactor.

5. Process according to any one of claims 1, 2 or 3, in which the reaction medium comprises a solvent selected from the group consisting of phosphorus oxychloride, sulfuryl chloride and silicon tetrachloride and mixtures thereof.

6. Process according to claim 5 in which said reaction medium comprises a mixture of from 50 to 80% by volume of phosphorus oxychloride and 50 to 20% by volume of silicon tetrachloride.

7. Process according to any one of claims 1, 2 or 3, in which said hydrocyanic acid and chlorine are present in equimolar amounts.

8. Process according to claim 1 in which said reaction is carried out in a closed system under elevated pressure and the cyanogen chloride which is produced is subjected to further processing within said closed system.

9. Process according to claim 1 in which the inorganic solvent reaction medium comprises a dessicating solvent.

* * * * *